United States Patent
Krishnamoorthy et al.

(10) Patent No.: US 12,325,601 B2
(45) Date of Patent: *Jun. 10, 2025

(54) AUTOMATED CONTAINER UNLOADER

(71) Applicant: Intelligrated Headquarters, LLC, Mason, OH (US)

(72) Inventors: Sai Prasanth Krishnamoorthy, Baltimore, MD (US); Ramdas Pai, Pittsburgh, PA (US); David Pepley, Pittsburgh, PA (US); Darius Scott, Baltimore, MD (US)

(73) Assignee: Intelligrated Headquarters, LLC, Mason, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/643,841

(22) Filed: Apr. 23, 2024

(65) Prior Publication Data

US 2024/0270516 A1 Aug. 15, 2024

Related U.S. Application Data

(60) Continuation of application No. 18/063,402, filed on Dec. 8, 2022, now Pat. No. 11,993,469, which is a
(Continued)

(51) Int. Cl.
*B65G 65/23* (2006.01)
*B65G 13/00* (2006.01)

(52) U.S. Cl.
CPC ............ *B65G 65/23* (2013.01); *B65G 13/00* (2013.01)

(58) Field of Classification Search
CPC ................................................... B65G 65/23
See application file for complete search history.

(56) References Cited

U.S. PATENT DOCUMENTS

| 3,978,999 A | 9/1976 | Ryder |
| 4,802,810 A | 2/1989 | Gunn |

(Continued)

FOREIGN PATENT DOCUMENTS

| CN | 1962381 A | 5/2007 |
| CN | 206375437 U | 8/2017 |

(Continued)

OTHER PUBLICATIONS

European Search Report Mailed on Oct. 11, 2022for EP Application No. 22167565.5, 8 page(s).
(Continued)

*Primary Examiner* — Jonathan Snelting
(74) *Attorney, Agent, or Firm* — Alston & Bird LLP

(57) ABSTRACT

Various embodiments illustrated herein disclose a container unloader device. The container unloader device comprises a platform to receive a container, wherein the container comprises a package. The container unloader device also comprises a front panel configured to move between a raised orientation and a lowered orientation, wherein when the front panel being is in the raised orientation, the front panel is orthogonal with respect to the platform, and when the front panel is in the lowered orientation, the front panel and the platform form a continuous surface. The platform can be pivoted from a first angle to a second angle, that is greater than the first angle. The package leans against the front panel the front panel is in the raised orientation. The package is released on a surface of a conveyor when the front panel is in the lowered orientation.

10 Claims, 12 Drawing Sheets

Related U.S. Application Data division of application No. 17/244,132, filed on Apr. 29, 2021, now Pat. No. 11,548,742.

(56) References Cited

U.S. PATENT DOCUMENTS

| | | | |
|---|---|---|---|
| 11,104,527 | B1 | 8/2021 | Zhao et al. |
| 11,993,469 | B2 * | 5/2024 | Krishnamoorthy .... B65G 65/23 |
| 2004/0022608 | A1 | 2/2004 | Lilley |
| 2014/0025375 | A1 | 1/2014 | Norvell |
| 2020/0270076 | A1 | 8/2020 | Geyer et al. |
| 2022/0055845 | A1 | 2/2022 | Lustig |

FOREIGN PATENT DOCUMENTS

| | | |
|---|---|---|
| CN | 209009394 U | 6/2019 |
| EP | 3670406 A1 | 6/2020 |
| FR | 3010989 A1 | 3/2015 |
| JP | 63-088624 U | 6/1988 |
| JP | 2002-128281 A | 5/2002 |
| JP | 4591734 B2 | 12/2010 |
| JP | 2019-135190 A | 8/2019 |
| WO | 2013/008211 A1 | 1/2013 |

OTHER PUBLICATIONS

Examiner Interview Summary Record (PTOL-413) Mailed on Sep. 9, 2022 for U.S. Appl. No. 17/244,132.
Non-Final Office Action Mailed on May 6, 2022 for U.S. Appl. No. 17/244,132.
Non-Final Rejection Mailed on Sep. 29, 2023 for U.S. Appl. No. 18/063,402, 5 page(s).
Notice of Allowance and Fees Due (PTOL-85) Mailed on Dec. 15, 2022 for U.S. Appl. No. 17/244,132.
Notice of Allowance and Fees Due (PTOL-85) Mailed on Jan. 24, 2024 for U.S. Appl. No. 18/063,402, 7 page(s).
Notice of Allowance and Fees Due (PTOL-85) Mailed on Sep. 9, 2022 for U.S. Appl. No. 17/244,132.
Requirement for RestrictionElection Mailed on Feb. 28, 2022 for U.S. Appl. No. 17/244,132.
U.S. Appl. No. 18/063,402, filed Dec. 8, 2022, 2023-0110253, Allowed.
U.S. Appl. No. 17/244,132, filed Apr. 29, 2021, U.S. Pat. No. 11,548,742, Issued.
Intention to grant Mailed on Jun. 7, 2024 for EP Application No. 22167565, 9 page(s).
CN Office Action Mailed on Dec. 28, 2024 for CN Application No. 202210333115, 9 page(s).
English Translation of CN Office Action dated Dec. 28, 2024 for CN Application No. 202210333115, 7 page(s).
Decision to grant a European patent Mailed on Oct. 17, 2024 for EP Application No. 22167565, 2 page(s).

* cited by examiner

AUTOMATED CONTAINER UNLOADER

CROSS-REFERENCE TO RELATED APPLICATIONS

This application is a continuation of U.S. Non-Provisional application Ser. No. 18/063,402, filed Dec. 8, 2022, which is a divisional of U.S. patent application Ser. No. 17/244,132, filed Apr. 29, 2021 (now U.S. Pat. No. 11,548,742, issued Jan. 10, 2023), the contents of each of which are hereby incorporated by reference in their entirety.

TECHNICAL FIELD

Example embodiments of the present disclosure relate generally to container unloaders, and a method of automatically unloading containers from the container unloader using a robotic device.

BACKGROUND

Containers such as Unit Load Devices (ULDs) are used to transport packages or cargo in a warehouse or to an aircraft. Each of the containers hold a plurality of packages to be transported from one location to another. In some cases, each of the containers can be provided with wheels so that the containers can be rolled in and out of a loading or an unloading area in the warehouse. Further, there can be significant transportation costs and efforts associated with the conveyance of each of the containers holding the plurality of packages. Thus, manually loading and unloading containers leads to errors, mismanagement of overall workflow, and increased costs.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION OF THE INVENTION

Figure 1:
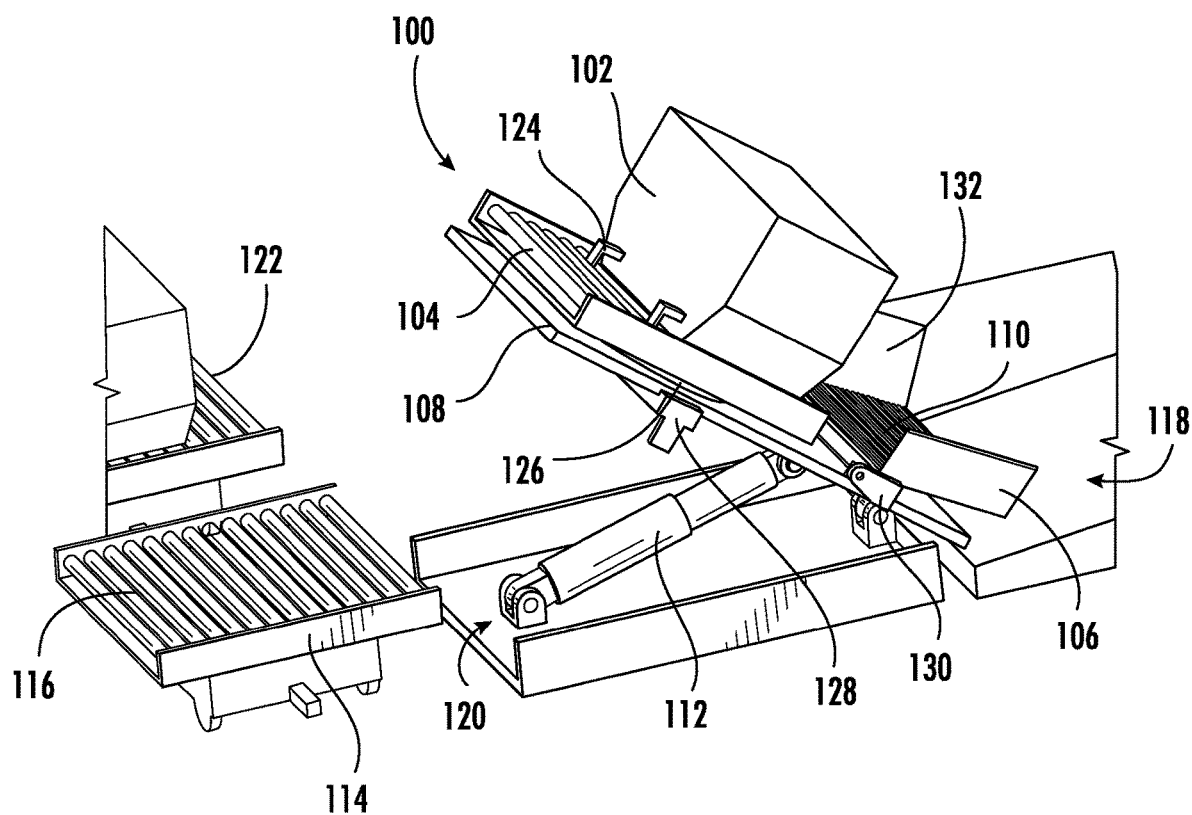
FIG. 1 illustrates an exemplary perspective view of a container unloader, according to one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various embodiments disclosed herein provide for a container unloader which can receive a container, wherein the container comprises one or more packages and an opening through which the one or more packages can be released. The container unloader comprises a platform to receive the container, a front panel, and an actuator. The platform configured to receive the container can be placed at a first angle with respect to a ground surface. Further, the platform configured to receive the container can be moved to a second angle with respect to the ground surface, wherein the second angle can be greater than the first angle. The front panel of the container unloader can be configured to move between a raised orientation and a lowered orientation with respect to the platform. In the raised orientation, the front panel of the container unloader can be orthogonal with respect to the platform. In the lowered orientation, the front panel and the platform can form a continuous surface. The actuator of the container unloader can be configured to pivot the platform from the first angle to the second angle, wherein the one or more packages lean against a surface of the front panel when the front panel is in the raised orientation and the platform is at the second angle, and wherein the one or more packages are released onto a surface of a conveyor when the front panel is in the lowered orientation and the platform is at the second angle. The use of a container unloader can eliminate the need for manual labor to load and unload the container comprising the one or more packages, thus reducing effort and cost related to container transportation and manual efforts.

In some embodiments, the container unloader can comprise a rotary joint. The rotary joint can be configured to be positioned between the platform of the container unloader and a surface of the container. The rotary joint is configured to rotate the container with respect to the front panel. In some other embodiments, the rotary joint is configured to rotate the container around a rotational axis that is normal with respect to the platform.

In some embodiments, the rotary joint can comprise a rotating plate and a cylindrical rod attached to the rotating plate, wherein the rotating plate is configured to be placed between the platform of the container unloader and the surface of the container. The platform can comprise a hollow portion to engage the cylindrical rod such that the cylindrical rod can be configured to be rotated to control the rotating plate. In some embodiments, movement of the cylindrical rod can be controlled using a motor. The rotating plate can be configured to rotate such that the one or more packages in the container are released through the opening of the container.

In some embodiments, the container can be rotated when the front panel is in the raised orientation with respect to the platform. In some other embodiments, the container can be rotated when the front panel is in the lowered orientation with respect to the platform. In yet some other embodiments, the rotary joint can comprise any suitable material, such as any other metal or composite material.

In some embodiments, the front panel of the container unloader can comprise of at least one or more of a first side panel and a second side panel, wherein the first side panel and the second side panel can be configured to be placed in an upright position with respect to a surface of the front panel.

In some embodiments, the front panel can comprise any suitable material, such as any other metal, core material, composite material, or a laminate material.

In some embodiments, the container comprising the one or more packages can further comprise a frame, wherein the frame can form a primary structure of the container. In some other embodiments, a first side panel and a second side panel can be attached to the frame of the container. In yet some other embodiments, a top panel, a bottom panel, and a back panel can also be attached to the frame of the container. In yet some other embodiments, one or more front panels can be attached to the frame to create the opening through which the one or more packages can be released from the container.

In some embodiments, at least one or more of the container and the frame can comprise any suitable material, such as any metal, core material, composite material, laminate material. In some other embodiments, the container can be covered with at least one of a plastic sheet, aluminum sheets, fabric-reinforced tarpaulin sheets, or sheets of any other material.

In some embodiments, the container unloader can comprise a roller bed to receive the container, wherein the roller bed can be configured to be placed on the platform of the container unloader.

In some embodiments, the container unloader can receive the container from a robotic device. The robotic device from which the container unloader receives the container can be at least one or more of an automated guided vehicle (AGV) and an autonomous mobile robot (AMR).

In some embodiments, the container unloader can receive the container from an operator driven vehicle. The operator driven vehicle from which the container unloader receives the container can be a fork-lift truck.

In some embodiments, the container can be latched to a surface of the platform of the container unloader using a locking mechanism. In yet some other embodiments, the locking mechanism used to latch the container to the surface of the platform can be at least one or more latches.

In some embodiments, the platform of the container unloader can comprise any suitable material, such as any metal, hard plastic, core material, laminate material, composite material.

In some embodiments, shape and dimension of the container can be such that the container can be placed in a fuselage of an aircraft. In some other embodiments, the container can comprise at least one of aircraft luggage, cargo, mail, or any other type of freight which can be unloaded from the aircraft. In some embodiments, the container can be configured to have one or more shelves in the container to place the one or more packages on.

FIG. 1 illustrates an exemplary perspective view of a container unloader 100, according to one or more embodiments described herein. The container unloader 100 can further comprise a platform 108 and a front panel 110. The platform 108 of the container unloader 100 can receive a container 102 comprising a package. In some embodiments, the container 102 can comprise an opening in a front surface of the container 102 such that the package can be released from the container 102 through the opening in the front surface of the container 102. In some other embodiments, the opening in the front surface of the container 102 can comprise at least one of a rectangular shape, a circular shape, or any other geometrical shape.

The container 102 can be transported to the platform 108 using a robotic device, such as 114 and 122. In some embodiments, the robotic device, such as 114 and 122 can be at least one of an automated guided vehicle (AGV) and an autonomous mobile robot (AMR). In some embodiments, the robotic device, such as 114 and 122 can comprise a first roller bed such as 116 to receive the container 102.

In some embodiments, the robotic devices 114 and 122 can be similar to each other in shape and dimension. In some other embodiments, the robotic devices 114 and 122 can be different from each other in shape and dimension.

In some other embodiments, the platform 108 of the container unloader 100 can further comprise a second roller bed 104 to receive the container 102 from the robotic device 114. The platform 108 of the container unloader 100 can be moved from a first angle to a second angle that is greater than the first angle using an actuator 112. In some embodiments, the actuator 112 can move the platform 108 from the first angle to the second angle such that at the second angle, the container 102 is at an elevated height from a ground surface. The actuator 112 can further be placed on a base 120 of the container unloader 100. In some embodiments, the actuator 112 of the container unloader 100 can be at least one of a hydraulic actuator, an electric actuator, a lead screw, a belt-driven actuator, or any other type of lift actuator. In some other embodiments, the actuator 112 can be a telescopic actuator.

Further, the front panel 110 can be configured to pivot between a raised orientation and a lowered orientation. When the front panel 110 is in the raised orientation, the front panel 110 can be orthogonal with respect to the platform 108. When the front panel 110 is in the lowered orientation, the front panel 110 and the platform 108 can form a continuous surface. In some embodiments, a drive system such as 130 can be used to control movement of the front panel 110 from the raised orientation to the lowered orientation. The drive system 130 can be a motor-driven system, a hydraulic system, or any other drive system. In some embodiments, the drive system 130 can comprise an actuator that can move the front panel 110 from the raised orientation to the lowered orientation and vice versa. In some other embodiments, the drive system 130 can control the front panel 110 such that the front panel 110 can be lowered up to a desired angle with respect to the platform 108.

In some embodiments, when the actuator 112 moves the platform 108 of the container unloader 100 from the first angle to the second angle and the front panel 110 is in the raised orientation, the package in the container 102 can fall through the opening in the front surface of the container 102 and lean against a surface of the front panel 110. In some embodiments, the surface of the front panel 110 against which the package of the container 102 can lean can be at least one of a corrugated surface or a smooth surface. Further, when the front panel 110 is pivoted to move from the raised orientation to the lowered orientation, the package in the container 102 can be released onto a surface of a conveyor 118. In some embodiments, the conveyor 118 can be independent from the platform 108 of the container unloader 100. In some other embodiments, the conveyor 118 can be attached to the platform 108 of the container unloader 100 using an attachment means, such as one or more hinges, which can generate a pivoting movement of the platform 108 with respect to the conveyor 118.

In some embodiments, the front panel 110 can further comprise a first side panel 106 and a second side panel 132. The first side panel 106 and the second side panel 132 can be configured to be placed in an upright position with respect to the platform 108 to ensure that the package from the container 102 released onto the surface of the conveyor 118 does not fall from one or more edge surfaces of the front panel 110 on the ground surface.

In some embodiments, the container 102 can comprise any shape and size such that the container 102 can fit into a cargo area of an aircraft. In some other embodiments, a sensing module, such as a camera, can be used to detect whether the container 102 comprises the package. In yet some other embodiments, the sensing module can be used to detect whether the package has been released from the container 102 onto the surface of the conveyor 118.

In some embodiments, a rotary joint 126 can be placed between the container 102 and a surface of the platform 108 on which the container 102 is placed. The rotary joint 126 can be used to rotate the container 102 around a rotational axis that is normal to one or more of the platform 108 and the front panel 110 of the container unloader 100. In some embodiments, a motor 128 can be used to control the rotation of the rotary joint 126.

In some embodiments, the rotary joint 126 can be configured to rotate the container 102 when the front panel 110 is in the raised orientation. The front panel 110 can be placed at a first offset distance from the container 102 such that the container 102 can rotate around the rotational axis that is normal to the platform 108. In some other embodiments, the rotary joint 126 can be configured to rotate the container 102 when the front panel 110 is in the lowered orientation to release the package in the container 102.

In some embodiments, when the container 102 is transported from the first roller bed 116 of the robotic device 114 to the second roller bed 104 of the platform 108, a locking mechanism can be used to latch the container 102 to a surface of the second roller bed 104. In some embodiments, one or more latches such as 124 can be used to latch the container 102 into position on the second roller bed 104. In response to the latches such as 124 latching the container 102 into position on the second roller bed 104, the actuator 112 can lift a combination of the platform 108, the second roller bed 104, and the container 102 to the elevated height from the ground surface. The front panel 110 can then be configured to move from the raised orientation to the lowered orientation to release the package in the container 102 onto the surface of the conveyor 118 through the opening in the front surface of the container 102.

In some embodiments, when the container 102 is placed on the second roller bed 104 of the platform 108, the container 102 and the second roller bed 104 can rotate around the rotational axis that is normal to the platform 108 using the rotary joint 126. The rotary joint 126 can be positioned between the platform 108 and the second roller bed 104 such that at least one or more of the second roller bed 104 and the container 102 rotate with respect to the front panel 110. In some embodiments, the rotary joint 126 can be configured to rotate up to 90 degrees around the rotational axis. In some other embodiments, the rotary joint 126 can be configured to rotate up to any other degree around the rotational axis. One or more packages stuck in one or more portions of the container 102 can be dislodged due to the rotation of the container 102 using the rotary joint 126.

Figure 2:
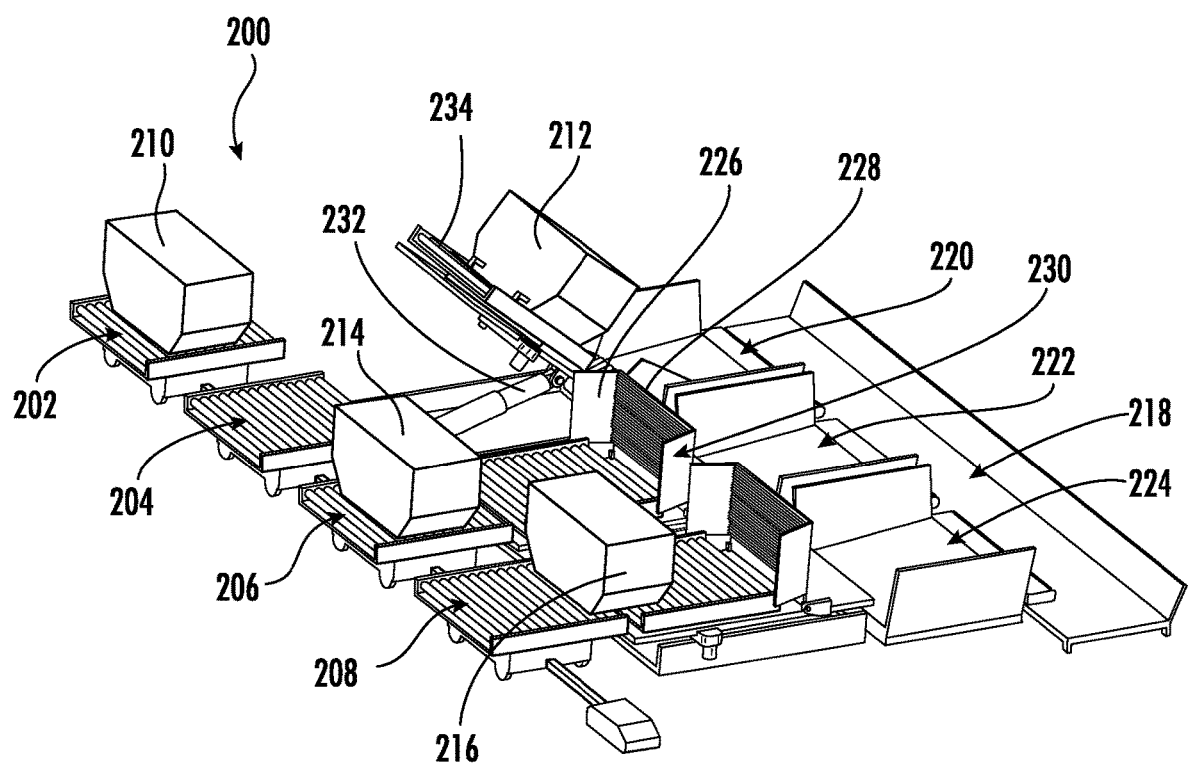
FIG. 2 illustrates an exemplary perspective view of a warehouse environment comprising a plurality of containers, according to one or more embodiments described herein.

FIG. 2 illustrates an exemplary perspective view of a warehouse environment 200 comprising a plurality of containers to be unloaded, according to one or more embodiments described herein. The warehouse environment 200 can further comprise robotic devices, such as 202, 204, 206, and 208, wherein the robotic devices 202, 204, 206, and 208 can each comprise a roller-bed on which containers such as 210, 212, 214, and 216 can be placed. The containers 210, 212, 214, and 216 can comprise one or more packages. The container 212 of the containers 210, 212, 214, and 216 can be placed in an elevated position using an actuator 232 to release the one or more packages in the container 212 on a surface of conveyors such as 220, 222, and 224. The actuator 232 can be a part of container unloaders such as 234, wherein the actuator 232 can be used to elevate the containers such as 210, 212, 214, and 216 to a first height at a back end surface of the containers such as 210, 212, 214, and 216 with respect to a ground surface, wherein the containers such as 210, 212, 214, and 216 can comprise at least a front end surface and the back end surface. The containers such as 210, 212, 214, and 216 can be configured to be elevated to the first height such that the back end surface of the containers such as 210, 212, 214, and 216 can be placed at an upward position with respect to conveyors such as 220, 222, and 224. The container unloaders such as 234 can comprise a front panel such as 228. The front panel 228 can further be configured to be moved in a raised orientation and a lowered orientation with respect to the conveyors such as 220, 222, and 224. When the containers such as 210, 212, 214, and 216 are not elevated, the front panel such as 228 can be placed in the raised orientation. When the containers such as 210, 212, 214, and 216 are elevated (illustrated by the container 212 in FIG. 2), the front panel such as 228 can be placed in the lowered position such that the one or more packages in the containers such as 210, 212, 214, and 216 can be released on the conveyors such as 220, 222, and 224.

The conveyors such as 220, 222, and 224 can be at least one or more of a belt-conveyor module or a roller-bed module. The conveyors 220, 222, and 224 can further be attached to a common conveyor 218. The common conveyor 218 can receive the one or more packages from the conveyors such as 220, 222, and 224.

In some embodiments, the conveyors such as 220, 222, and 224 can be similar to each other in shape and dimension. In some other embodiments, the conveyors such as 220, 222, and 224 can be different from each other in shape and dimension.

Figure 3A:
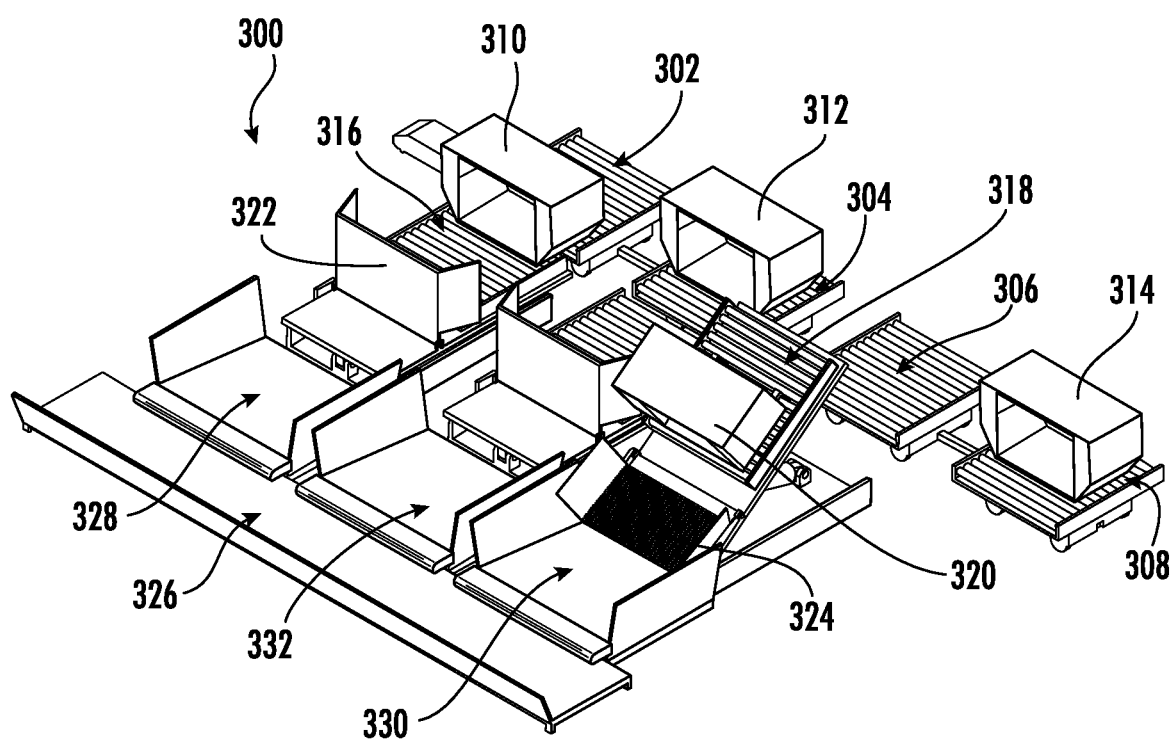
FIG. 3A illustrates an exemplary perspective view of a warehouse environment comprising a plurality of container unloaders to be unloaded, wherein the plurality of container unloaders comprise a plurality of front panels connected to a continuous conveyor, according to one or more embodiments described herein.

FIG. 3A illustrates an exemplary perspective view of a warehouse environment 300 comprising a plurality of container unloaders such as 316 and 318, wherein the plurality of container unloaders such as 316 and 318 can comprise a plurality of front panels such as 322 and 324 respectively, connected to a continuous conveyor 326, according to one or more embodiments described herein. The warehouse environment 300 further comprises robotic devices such as 302, 304, 306, and 308 that can transport containers such as 310, 312, 320, and 314. The containers such as 310, 312, 320, and 314 can further comprise one or more packages. The containers such as 310, 312, 320, and 314 can comprise an opening in a front surface of the containers such as 310, 312, 320, and 314 to release the one or more packages. The containers such as 310, 312, 320, and 314 can further be placed at a first angle with respect to a ground surface (as illustrated by the containers 310 and 312 in the figure), or at a second angle with respect to the ground surface, (as illustrated by the container 320 in the figure).

The container unloaders such as 316 and 318 can further comprise front panels such as 322 and 324 respectively. As illustrated in the figure, the front panel 322 of the container unloader 316 can be in a raised orientation when the container 310 is at the first angle with respect to the ground surface. Further, as illustrated in the figure, the front panel 324 of the container unloader 318 can be in a lowered orientation when the container 320 is at the second angle with respect to the ground surface. When the container 320 is at the second angle with respect to the ground surface and the front panel 324 is in the lowered orientation, the one or more packages in the container 320 can be released on a platform 330 of a plurality of platforms such as 328, 332, and 330, wherein the container unloaders such as 316 and 318 can further be connected to the plurality of platforms such as 328, 332, and 330.

The plurality of platforms such as 328, 332, and 330 can be connected to the continuous conveyor 326 such that the one or more packages released on the platform 330 of the plurality of platforms such as 328, 332 can be transported on the continuous conveyor 326.

Figure 3B:
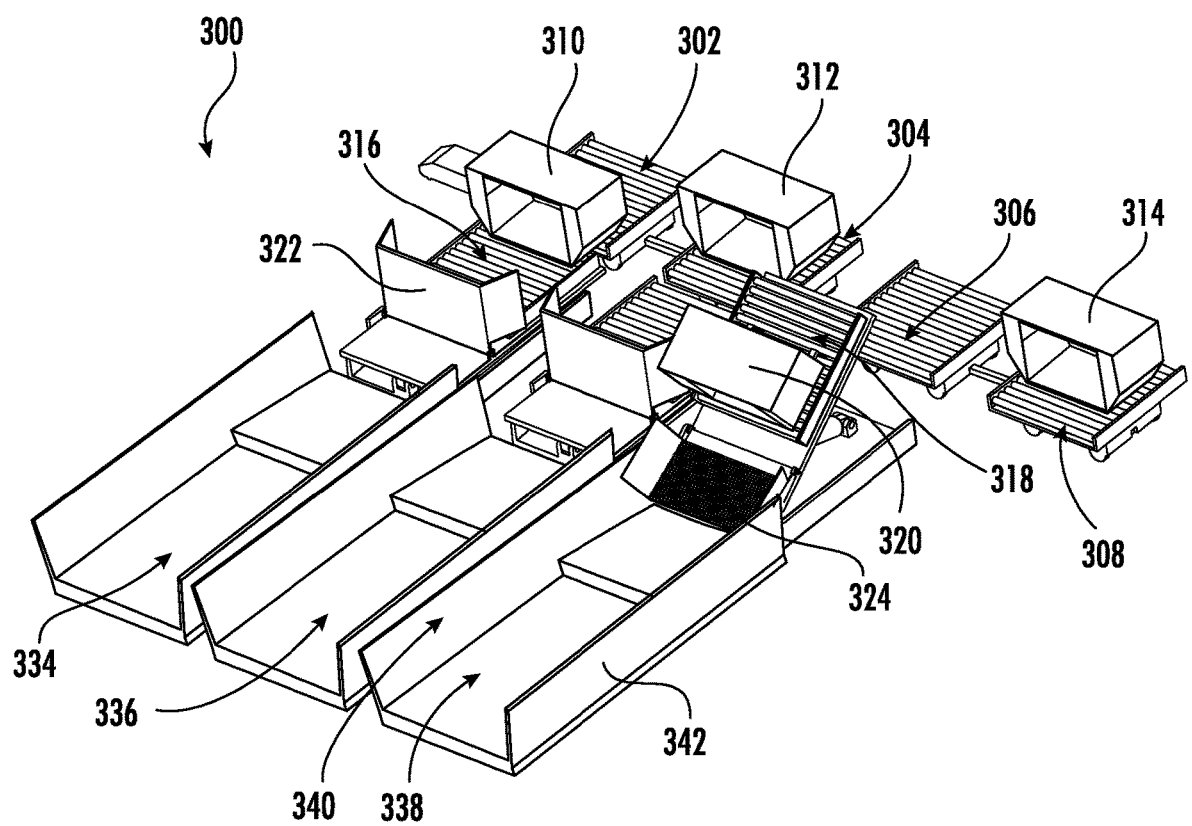
FIG. 3B illustrates an exemplary perspective view of a warehouse environment comprising a plurality of container unloaders, wherein the plurality of container unloaders comprise a plurality of front panels connected to a plurality of conveyors, according to one or more embodiments described herein.

FIG. 3B illustrates an exemplary perspective view of the warehouse environment 300 comprising the plurality of container unloaders such as 316 and 318, wherein the plurality of container unloaders 316 and 318 can comprise the plurality of front panels such as 322 and 324 respectively, connected to the plurality of conveyors such as 334, 336, and 338, according to one or more embodiments described herein. In some embodiments, the plurality of conveyors such as 334, 336, and 338 can be at least one or more of a belt conveyor, a roller conveyor, or any other type of conveyor. In some other embodiments, the plurality of conveyors such as 334, 336, and 338 can comprise a first side panel such as 340 and a second side panel such as 342.

Figure 4A:
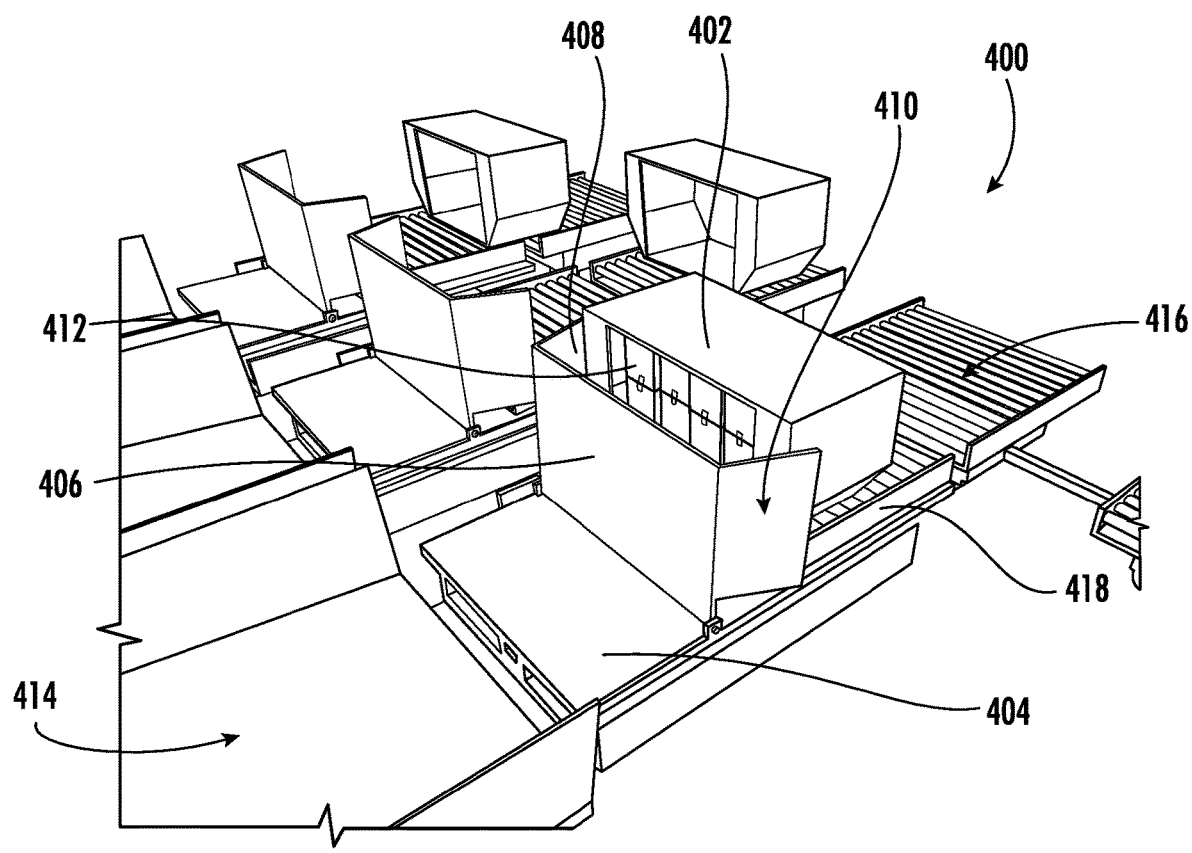
FIG. 4A illustrates an exemplary perspective view of a container unloader in a horizontal position with respect to a front panel connected to the container unloader, wherein the container unloader is in a raised orientation, according to one or more embodiments described herein.

FIG. 4A illustrates an exemplary perspective view of a warehouse environment 400 comprising a container unloader 418 in a horizontal position with respect to a front panel 406 attached to the container unloader 418, wherein the front panel 406 is in a raised orientation, according to one or more embodiments described herein.

The warehouse environment 400 can further comprise a device 416 to transport a container 402 to the container unloader 418. The container unloader 418 can further comprise a platform 404 and the front panel 406. The platform 404 can receive the container 402 being transported by the device 416. In some embodiments, the container unloader 418 can further comprise a roller bed on which the container 402 can be placed. The front panel 406 of the container unloader 418 can be in a raised orientation when the container 402 is at a first angle with respect to a ground surface. When the front panel 406 of the container unloader 418 is in the raised orientation, the front panel 406 can be orthogonal with respect to the platform 404 of the container unloader 418.

In some embodiments, the first angle at which the container 402 is placed with respect to the ground surface can be a zero-degree angle in which the container 402 can be placed in a horizontal position with respect to the ground surface.

As illustrated in FIG. 4A, the container 402 can comprise one or more packages such as 412 which can be released from the container 402 through an opening in a front face of the container 402 to a conveyor 414, wherein the front face of the container 402 can face the front panel 406 of the container unloader 418. In some embodiments, the front panel 406 of the container unloader 418 can further comprise a first side panel 408 and a second side panel 410, wherein front panel 406, the first side panel 408 and the second side panel 410 can be in an upright position with respect to a platform 404 of the container unloader 418.

In some embodiments, the device 416 from which the container unloader 418 receives the container 402 can be a robotic device such as an automated guided vehicle (AGV) or an autonomous mobile robot (AMR). In some other embodiments, the device 416 can be a fork-lift truck.

Figure 4B:
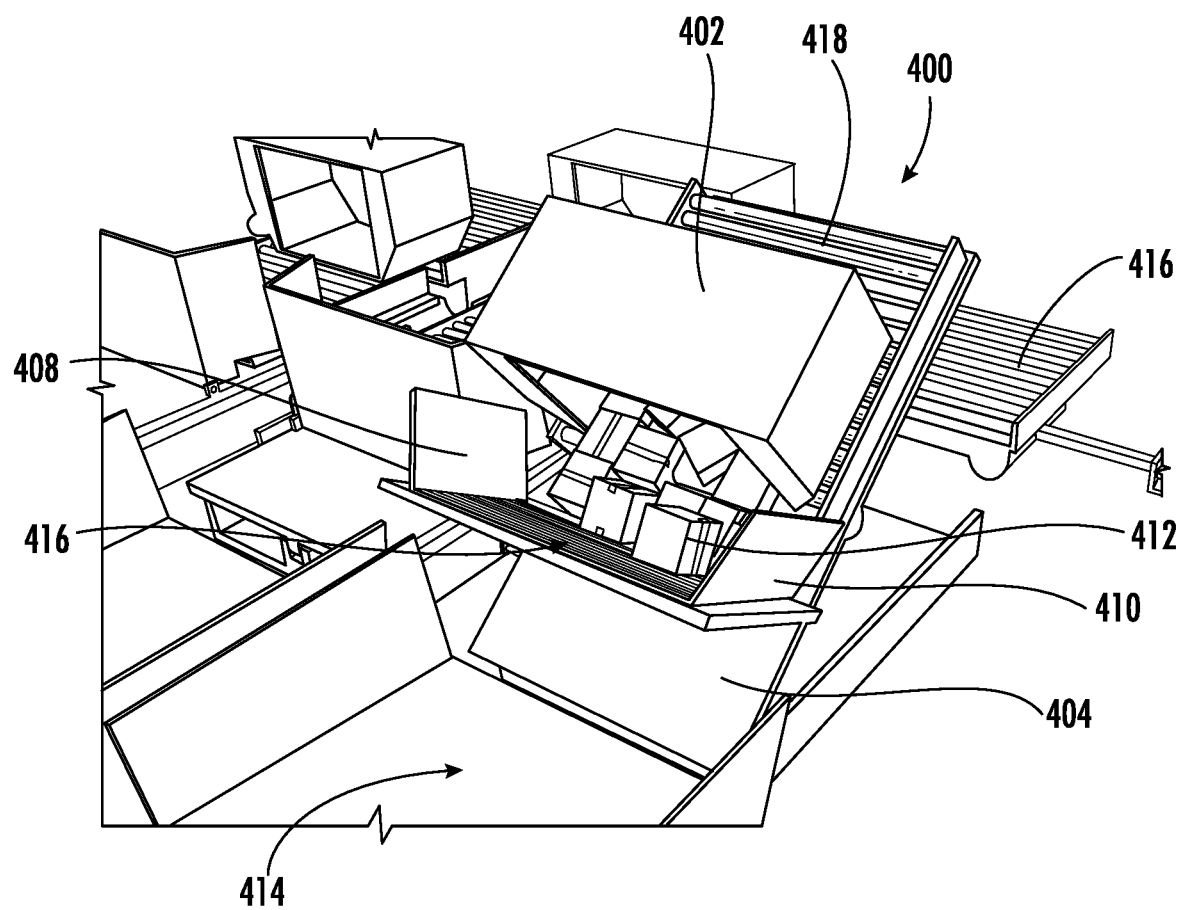
FIG. 4B illustrates an exemplary perspective view of the container unloader in an inclined position with respect to the front panel connected to the container unloader, wherein the container unloader is in the raised orientation, according to one or more embodiments described herein.

FIG. 4B illustrates an exemplary perspective view of the container unloader 418 in an inclined position with respect to the front panel 406 attached to the container unloader 418, wherein the container unloader 418 is in the raised orientation, according to one or more embodiments described herein.

The platform 404 of the container unloader 418 can be configured to move from the first angle to a second angle using an actuator, wherein the second angle is greater than the first angle. When the platform 404 of the container unloader 418 is at the first angle, the platform 404 can be horizontal with respect to the ground surface. When the platform 404 of the container unloader 418 is at the second angle, the actuator can be configured to raise the platform 404 of the container unloader 418 such that the container 402 can be placed at an elevated height with respect to the ground surface.

As illustrated in FIG. 4B, when the container unloader 418 is placed in the inclined position, the one or more packages such as 412 can move out from the container 402 and lean against a surface of the front panel 406. The first side panel 408 and the second side panel 410 of the front panel 406 can be used to ensure that the one or more packages such as 412 do not fall over from one or more edge surfaces of the front panel 406 on the ground surface.

Figure 4C:
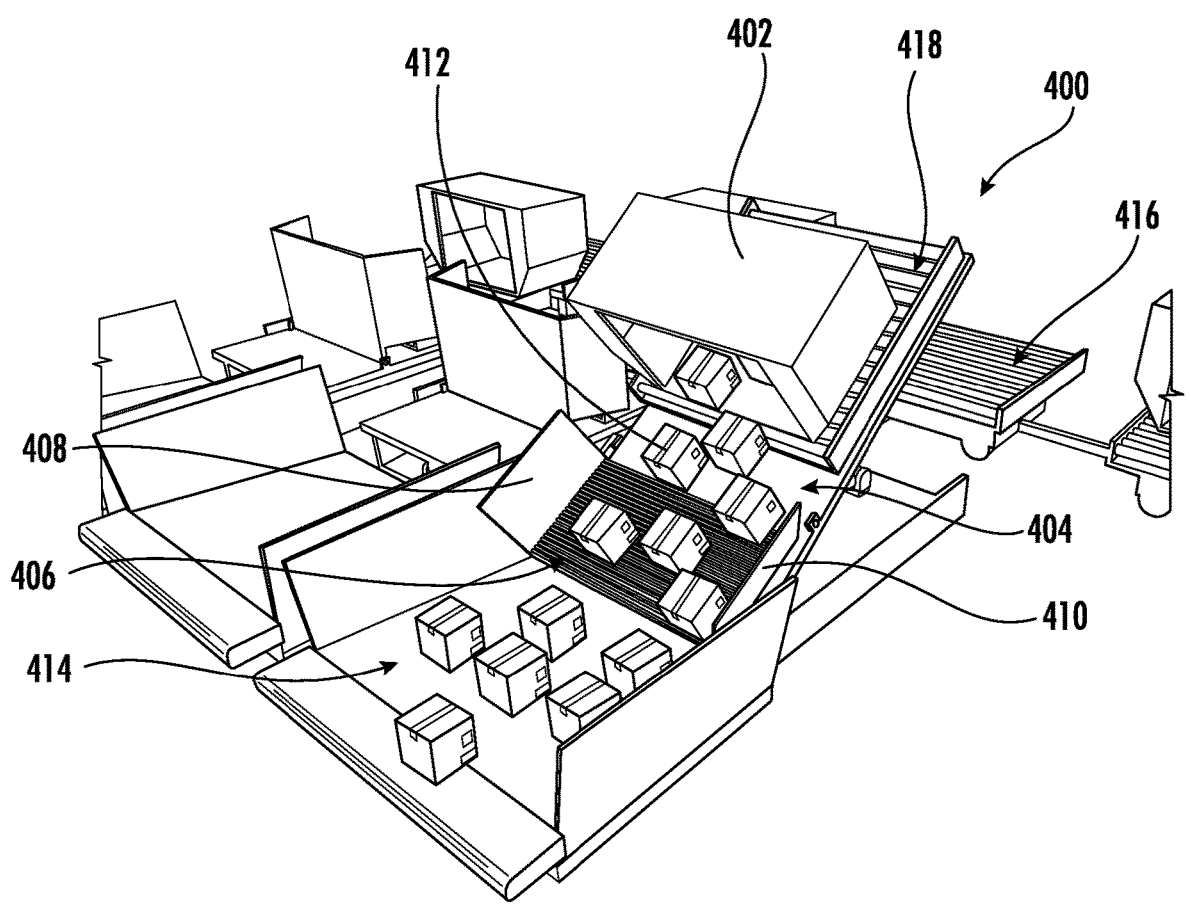
FIG. 4C illustrates an exemplary perspective view of the container unloader in an inclined position with respect to the front panel connected to the container unloader, wherein the container unloader is in a lowered orientation, according to one or more embodiments described herein.

FIG. 4C illustrates an exemplary perspective view of the container unloader 418 in an inclined position with respect to the front panel 406 attached to the container unloader 418, wherein the front panel 406 is in a lowered orientation, according to one or more embodiments described herein. As illustrated in FIG. 4C, when the front panel 406 of the container unloader 418 is in the lowered orientation, the one or more packages 412 in the container 402 can be released from the surface of the front panel 406 to a surface of the conveyor 414.

Figure 5A:
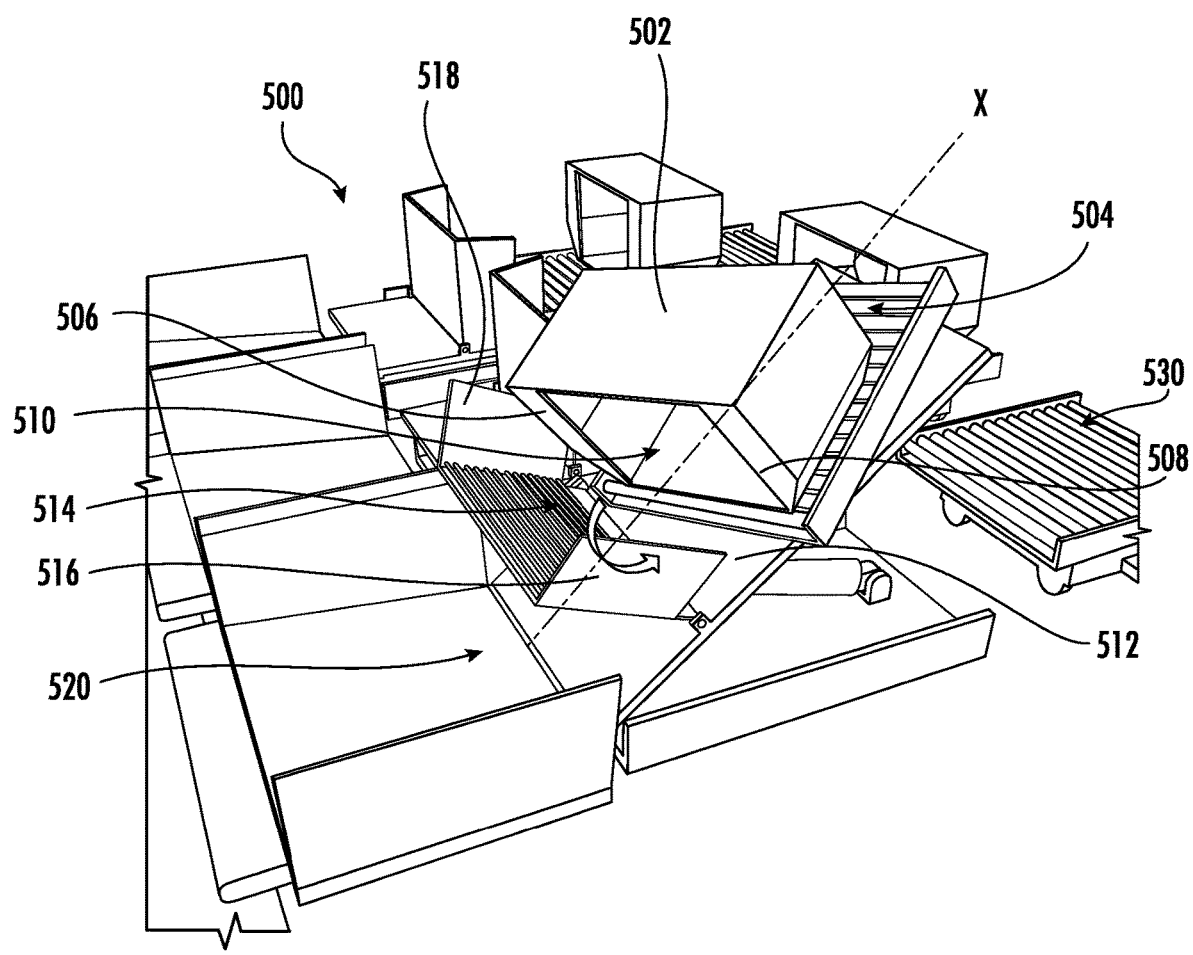
FIG. 5A illustrates an exemplary perspective view of rotation of a container unloader with respect to a front panel connected to the container unloader, wherein the front panel is in a raised orientation, according to one or more embodiments described herein.

FIG. 5A illustrates an exemplary perspective view of rotation of a container 502 placed on a container unloader 504 with respect to a front panel 514 and a platform 512 of the container unloader 504 in a warehouse environment 500, wherein the front panel 514 is in a raised orientation, according to one or more embodiments described herein. The container 502 can comprise one or more packages. In some embodiments, the front panel 514 of the container unloader 504 can be moved between the raised orientation and a lowered orientation (shown in FIG. 5B) using a drive system, wherein the drive system can be at least one or more of a motor drive system, a hydraulic drive system, or any other actuator-based drive system. In some other embodiments, the front panel 514 of the container unloader 504 can further comprise a first side panel 516 and a second side panel 518.

In some embodiments, a front face of the container 502 which faces the front panel 514 can comprise a square opening 510. Further, the front face of the container 502 can comprise a first side panel 506 and a second side panel 508. The square opening 510 can be used to transport the one or more packages in the container 502 to a surface of the front panel 514, wherein the front panel 514 can be in a raised orientation.

In some embodiments, the container 502 can be latched on a roller bed surface on the platform 512 of the container unloader 504 using one or more latches, such that the container 502 is locked in a position on the platform 512 of the container unloader 504. As illustrated in FIG. 5A, the container 502 can rotate in an anti-clockwise direction around a rotational axis X which is normal to the front panel 514 of the container unloader 504. In some embodiments, the container 502 can be configured to be placed on the platform 512 of the container unloader 512 at an offset distance from the front panel 514 of the container unloader 504. The offset distance between the container 502 and the front panel 514 of the container unloader 504 can be determined as a minimum distance at which the container 502 can rotate around the rotational axis X which is normal to the front panel 514 of the container unloader 504.

Figure 5B:
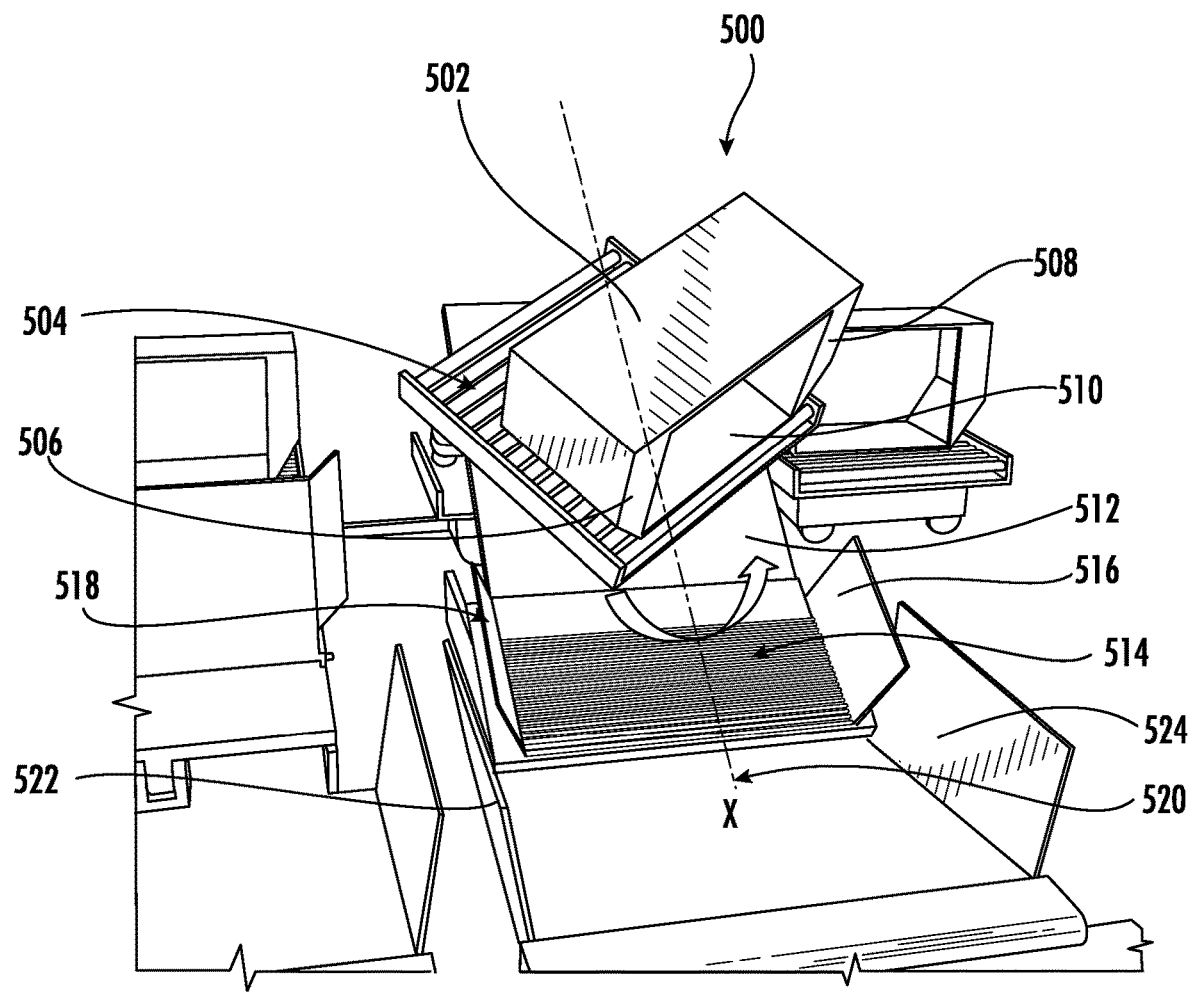
FIG. 5B illustrates an exemplary perspective view of rotation of a container unloader with respect to a front panel connected to the container unloader, wherein the front panel is in a lowered orientation, according to one or more embodiments described herein.

FIG. 5B illustrates an exemplary perspective view of rotation of the container unloader 504 on which the container 502 is placed, with respect to the front panel 514 connected to the container unloader 504, wherein the front panel 514 is in a lowered orientation, according to one or more embodiments described herein. In some embodiments, the container 502 can rotate in the anti-clockwise direction around the rotational axis X which is normal to the front panel 514 of the container unloader 504 (as illustrated in the figure). In some other embodiments, the container 502 can rotate in a clockwise direction around the rotational axis X which is normal to the front panel 514 of the container unloader 504.

Figure 5C:
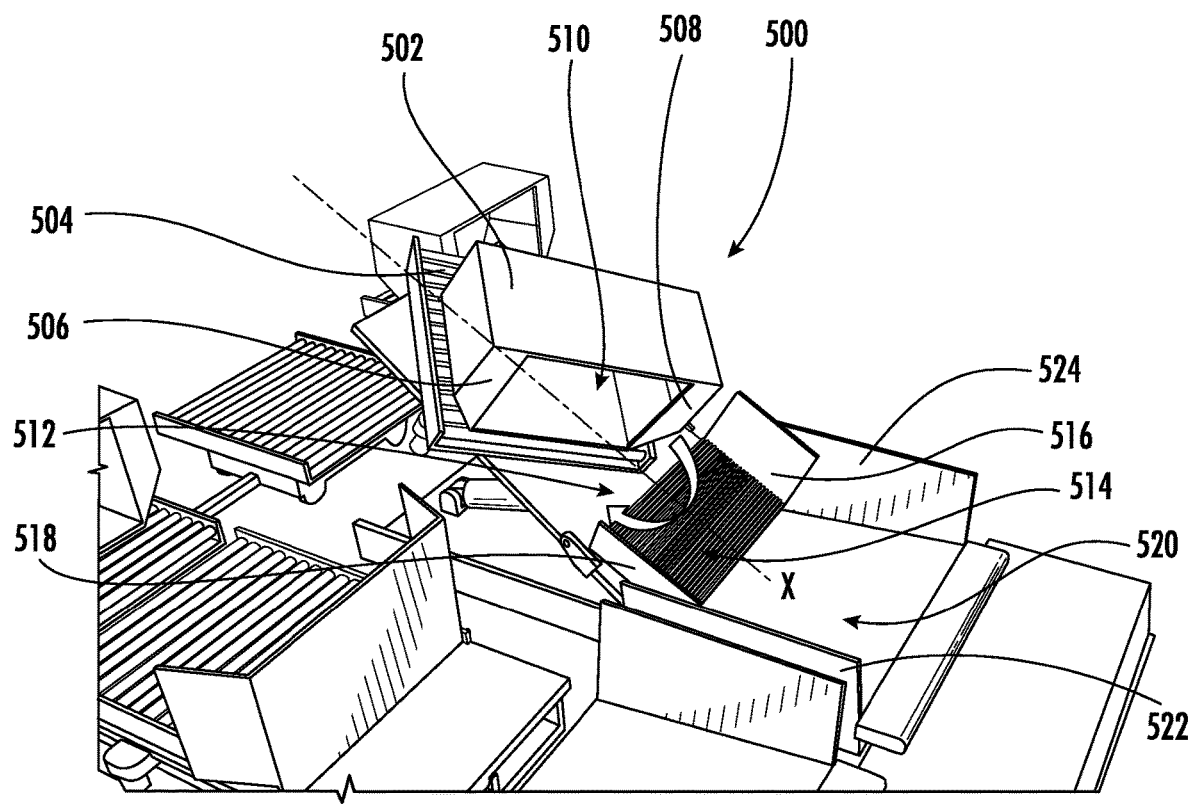
FIG. 5C illustrates an exemplary perspective side view of rotation of a container unloader with respect to a front panel connected to the container unloader, wherein the front panel is in a lowered orientation, according to one or more embodiments described herein.

FIG. 5C illustrates an exemplary perspective side view of rotation of the container unloader 504 on which the container 502 is placed, with respect to the front panel 514 connected to the container unloader 504, wherein the front panel 514 is in the lowered orientation, according to one or more embodiments described herein. As illustrated in FIG. 5C, a combination of the container unloader 504 and the container 502 which is placed on the container unloader 504 can rotate in the clockwise direction around the rotational axis X, wherein the rotational axis X is normal with respect to the front panel 514 of the container unloader 504.

Figure 5D:
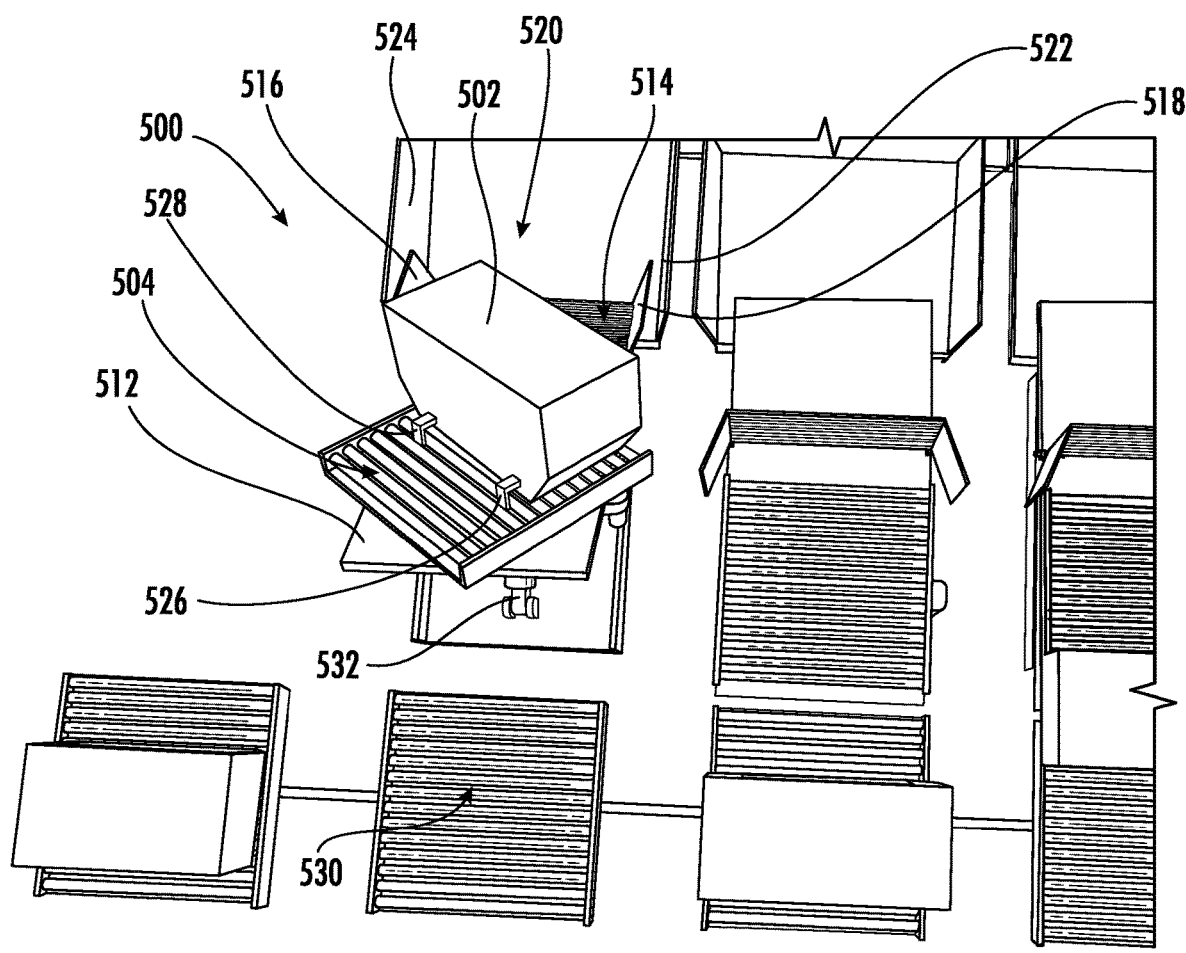
FIG. 5D illustrates an exemplary perspective top view of rotation of a container unloader with respect to a front panel connected to the container unloader, wherein the front panel is in a lowered orientation, according to one or more embodiments described herein.

FIG. 5D illustrates an exemplary perspective top view of rotation of the container unloader 504 on which the container 502 is placed, with respect to the front panel 514 connected to the container unloader 504, wherein the front panel 514 of the container unloader 504 is in the lowered orientation, according to one or more embodiments described herein. The container 502 can be latched in position on the container unloader 504 using one or more latches such as 504 and 526. The container unloader 504 can further comprise of the platform 512 on which the container 502 is placed.

In some embodiments, the platform 512 of the container unloader 504 can be moved from a first angle to a second angle using an actuator 532, wherein the second angle is greater than the first angle. When the actuator 523 has moved the platform 512 from the first angle to the second angle, the container 502 can rotate in the clockwise direction or the anti-clockwise direction around the rotational axis X.

In some embodiments, the container 502 can be placed on a roller bed on the platform 512 of the container unloader 504, such that a combination of the container 502 and the roller bed can rotate with respect to the platform 512 of the container unloader 504. In some embodiments, the front panel 514 of the container unloader 504 can comprise a first side panel 516 and a second side panel 518. In some other embodiments, the platform 512 of the container unloader 504 can be connected to a conveyor 520, wherein the conveyor 520 can further comprise a pair of side panels, such as 522 and 524.

Figure 6:
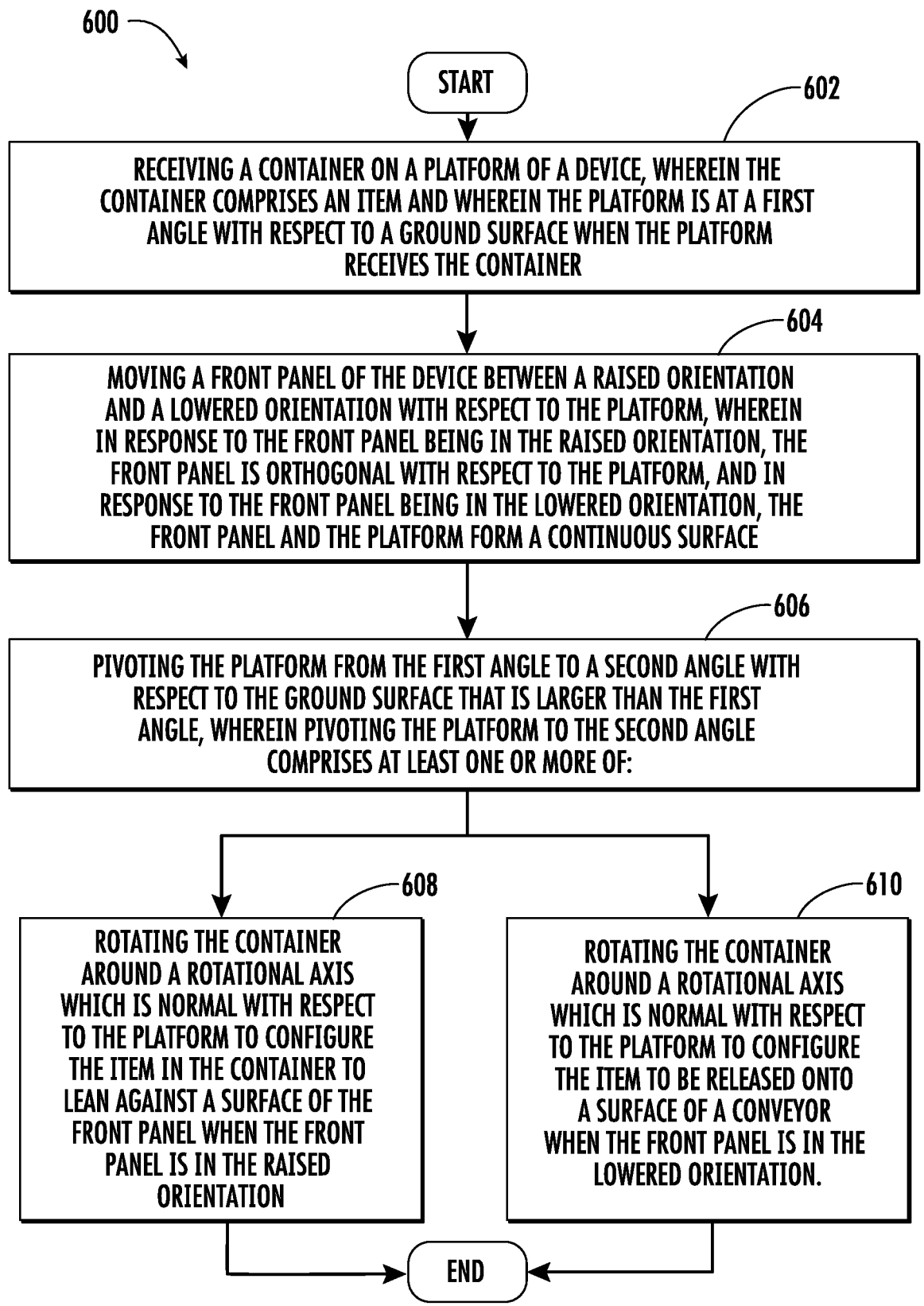
FIG. 6 illustrates an example flowchart representing a method of releasing a package onto a conveyor using the container unloader, in accordance with some example embodiments described herein.

FIG. 6 illustrates an example flowchart 600 representing a method of releasing a package onto a conveyor using the container unloader, in accordance with some example embodiments described herein.

The method starts at step 602. At step 602, a container can be received on a platform of a device, wherein the container can comprise an item. Further, the platform can be placed at a first angle with respect to a ground surface when the platform of the device receives the container.

At step 604, a front panel of the device can be moved between a raised orientation and a lowered orientation, such that the front panel of the device can be in the raised orientation when the front panel is orthogonal with respect to the platform of the device, and the front panel of the device can be in the lowered orientation when the front panel and the platform of the device form a continuous surface.

At step 606, the platform of the device can be pivoted from the first angle to a second angle with respect to the ground surface, wherein the second angle can be greater than the first angle.

In response to the platform of the device being pivoted from the first angle to a second angle with respect to the ground surface, the container can be rotated around a rotational axis which is normal with respect to the platform of the device such that the item in the container can be configured to lean against a surface of the front panel of the device when the front panel of the container is in the raised orientation, as is disclosed in step 608.

In an alternate embodiment, the container can be rotated around a rotational axis which is normal with respect to the platform of the device such that the item in the container can be configured to lean against a surface of the front panel of the device when the front panel of the container is in the lowered orientation, as is disclosed in step 610.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method comprising:
    moving a front panel of a device between a raised orientation and a lowered orientation with respect to a platform, wherein:
    in response to the front panel being in the raised orientation, the front panel is orthogonal with respect to the platform, and
    in response to the front panel being in the lowered orientation, the front panel and the platform form a continuous surface;
    pivoting the platform from a first angle to a second angle with respect to a ground surface that is larger than the first angle, wherein pivoting the platform to the second angle comprises at least one or more of:
    rotating a container around a rotational axis which is normal with respect to the platform to configure an item in the container to lean against a surface of the front panel when the front panel is in the raised orientation, wherein the platform is at the first angle with respect to the ground surface when the platform receives the container; and
    rotating the container around the rotational axis which is normal with respect to the platform to configure the item to be released onto a surface of a conveyor when the front panel is in the lowered orientation; wherein the method further comprises configuring a rotary joint to be placed between the platform of the device and the container to rotate the container around the rotational axis which is normal with respect to the platform.

2. The method of claim 1, further comprising configuring a first side panel and a second side panel of the front panel of the device to be placed in an upright position with respect to the surface of the front panel.

3. The method of claim 1, wherein the front panel of the device is composed of a friction reducing material.

4. The method of claim 1, further comprising configuring a roller bed to receive the container, wherein the roller bed is positioned on the platform of the device.

5. The method of claim 1, further comprising latching the container to a surface of the platform of the device using a locking mechanism.

6. The method of claim 5, wherein the locking mechanism comprises one or more latches.

7. The method of claim 1, wherein the rotary joint is configured to rotate up to 90 degrees around the rotational axis.

8. The method of claim 1, further comprising transporting the container to the device using at least one of a robotic device or a fork-lift truck.

9. The method of claim 8, further comprising transferring the container from at least one of the robotic device or the fork-lift truck to the platform of the device.

10. The method of claim 8, further comprising configuring the container to be transported from the platform of the device to at least one of the robotic device or the fork-lift truck after the item is released on the surface of the conveyor.

* * * * *